United States Patent [19]
Nakamura

[11] Patent Number: 5,923,006
[45] Date of Patent: Jul. 13, 1999

[54] LEVER SWITCH INCLUDING TWO SWITCHES AND AN ENGAGING MEMBER THAT OPERATIONALLY INTERLOCKS THE TWO SWITCHES

[75] Inventor: Shigeo Nakamura, Aichi, Japan

[73] Assignee: Kabushiki Kaisha Tokai Rika Denki Seisakusho, Niwa-gun, Japan

[21] Appl. No.: 08/880,159

[22] Filed: Jun. 24, 1997

[30] Foreign Application Priority Data

Jun. 25, 1996 [JP] Japan .................................. 8-185560

[51] Int. Cl.⁶ .............................. H01H 9/26; H01H 1/20; H01H 9/00
[52] U.S. Cl. ..................... 200/5 B; 200/50.32; 200/61.54
[58] Field of Search ................... 200/5 B, 61.54, 200/61.55, 61.27, 61.34, 50.32, 50.34

[56] References Cited

U.S. PATENT DOCUMENTS 5,629,505  5/1997  Cryer ................................... 200/61.54

FOREIGN PATENT DOCUMENTS 0 426 538  5/1991  European Pat. Off. .

*Primary Examiner*—Wynn Wood Coggins
*Assistant Examiner*—Michael J. Hayes
*Attorney, Agent, or Firm*—Morgan, Lewis & Bockius LLP

[57] ABSTRACT

When a front fog lamp and a rear fog lamp are turned on by swinging an operating knob 4, a holder 18 climbs up to the crest portion 13b of a cam 13 and brings the tip of an engaging piece 22 into contact with the edge face of a coupling member 41. When an operating knob 5 is swung from an OFF position to an AUTO position in this state, the engaging piece 22 is urged by a coil spring 21 to resiliently stick into an arcuate engaging hole 45. When the operating knob 5 is swung back to the OFF position, an operating knob 4 is swung back by the engaging piece 22 in an interlocking mode. Then the holder 18 climbs down from the crest 13b of the cam 13 and causes the rear fog lamp to be turned off and only the front fog lamp is held ON.

5 Claims, 4 Drawing Sheets

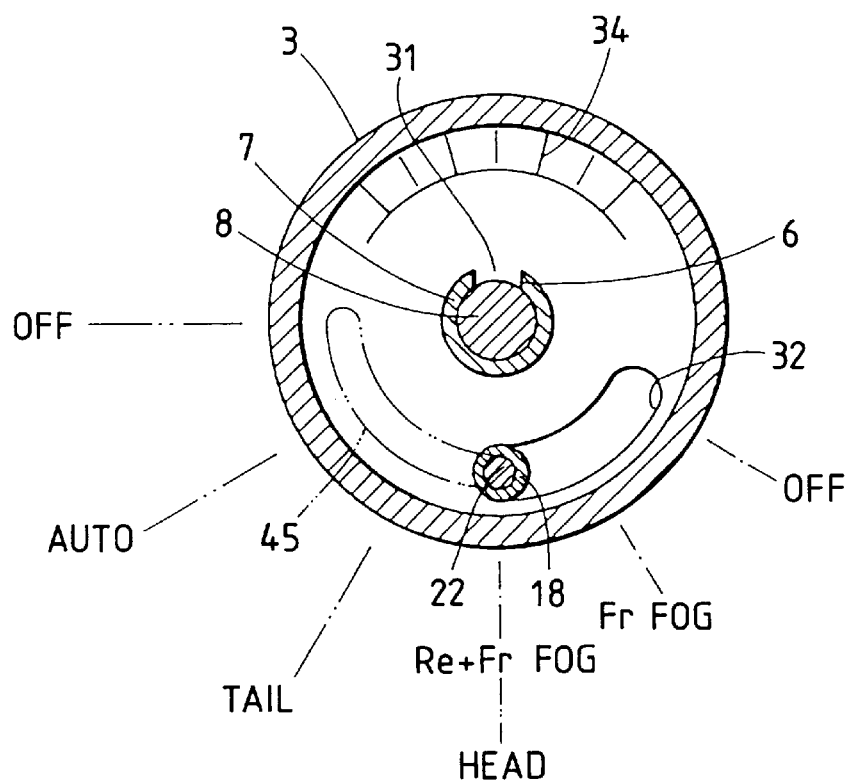

LEVER SWITCH INCLUDING TWO SWITCHES AND AN ENGAGING MEMBER THAT OPERATIONALLY INTERLOCKS THE TWO SWITCHES

BACKGROUND OF THE INVENTION

1. Field of the invention

The present invention relates to a lever switch.

2. Related art

Heretofore, a special electric circuit has been employed in a typical conventional lever switch which is used for automatically turning off an on-state rear fog lamp switch simultaneously when a light switch is turned off.

However, the aforementioned conventional lever switch entails high cost of production because it is formed with the special electric circuit and has to be assembled by securing a mounting space.

SUMMARY OF THE INVENTION

In view of the foregoing problems, an object of the present invention is to provide an inexpensive lever switch in which a partial improvement has been made in a mechanism to be incorporated into an operating lever with the omission of a special electric switch for automatically turning off an on-state second switch means simultaneously when a first switch means is turned off.

In order to accomplish the object above, a lever switch of the present invention for switching first switch means and second switch means respectively by the use of an operating knob for the first switch means and an operating knob for the second switch means, the first and second switch means being capable of swinging on an operating lever, the lever switch comprising: an engaging hole which is formed in the operating knob for the first, and a engaging member which is urged by a spring to be brought into contact with the operating knob for the first switch means when the operating knob for the second switch means is swung so as to turn on the second switch means, characterized in that: when the operating knob for the first switch means is swung toward an ON position, the engaging member which is urged by the spring to stick out resiliently is fitted into the engaging hole; when the operating knob for the first switch means is swung back from the ON position to an OFF position so as to turn off the first switch means, the operating knob for the second switch means is swung back in an interlocking mode by the engaging member kept in engagement with the engaging hole, whereby the second switch means is turned off.

The function of the lever switch as constructed above is as follows. While the first and second switch means are held ON, the engaging member fitted into the engaging hole formed in the operating knob for the first switch means causes the operating knob for the first switch means and the operating knob for the second switch means to be coupled together. When, therefore, the first switch means is turned off by swinging back the operating knob for the first switch means from an ON position to an OFF position, the operating knob for the second switch means is swung back in an interlocking mode so as to turn the second switch means. The lever switch thus functions according to the present invention necessitates no special electric circuit for automatically turning the second switch means and since it is only needed to improve part of the mechanism incorporated in the operating knob, the present invention has the effect of providing a lever switch having the function of automatically turning off a second switch means less expensively than before.

BRIEF DESCRIPTION OF THE DRAWINGS

FIG. 4 is a sectional view taken on line C—C of FIG. 1;

FIG. 6 is a diagram explanatory of switching modes of a light switch 47 and a fog lamp switch 16.

DETAILED DESCRIPTION OF THE PREFERRED EMBODIMENTS

Figure 1:
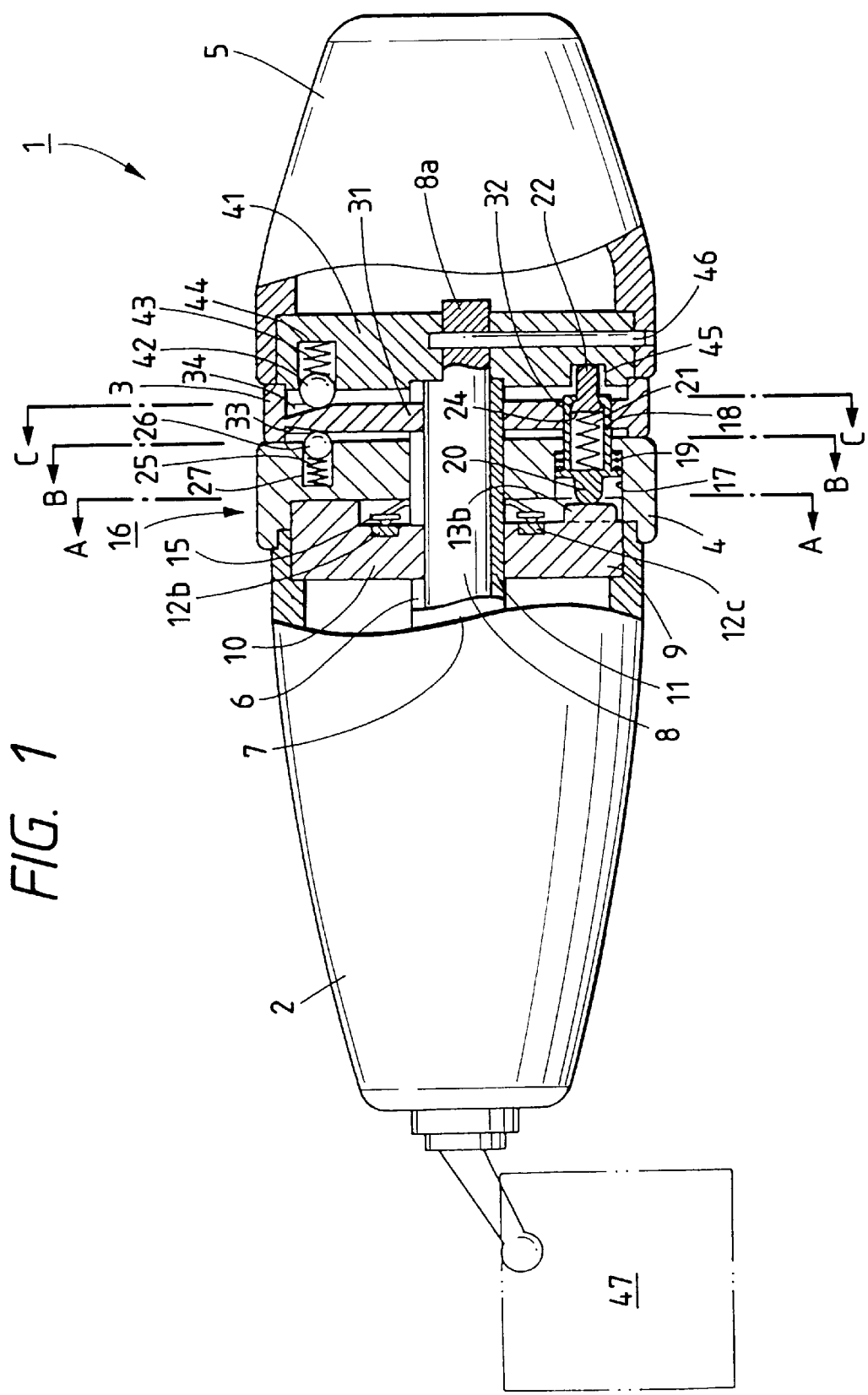
FIG. 1 is a partial cutaway side view of a operating knob 1 of a lever switch according to the present invention.
Figure 2:
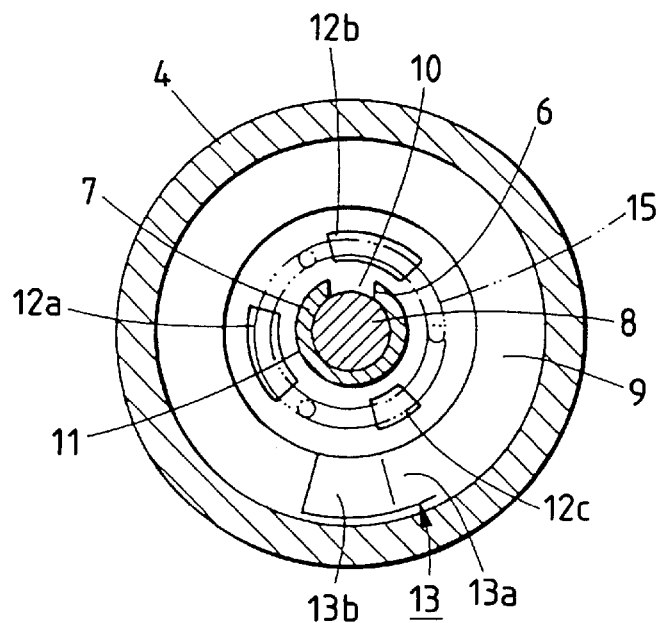
FIG. 2 is a sectional view taken on line A—A of FIG. 1.
Figure 3:
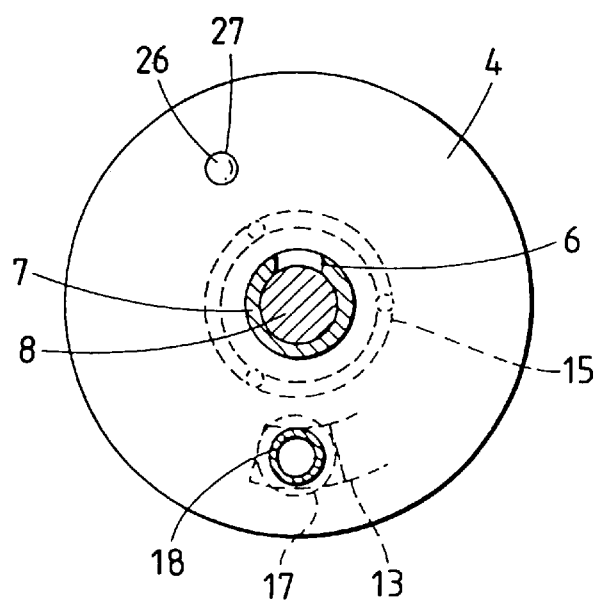
FIG. 3 is a sectional view taken on line B—B of FIG. 1.

Referring the accompanying drawings, there will be given a description of a mode for carrying out the present invention. FIG. 1 is a partial cutaway side view of an operating lever 1 of a lever switch according to the present invention; FIG. 2 a sectional view taken on line A—A of FIG. 1; FIG. 3 a sectional view taken on line B—B thereof; FIG. 4 a sectional view taken on line C—C thereof; FIG. 5 a diagram explanatory of the operation of automatically turning off a rear fog lamp; and FIG. 6 a diagram explanatory of switching modes of a light switch 47 as a first switch means and a fog lamp switch 16 as a second switch means. The enclosure of the operating lever 1, which enclosure incorporates the fog lamp switch 16, consists essentially a lower knob 2, a middle knob 3, an operating knob 4 for the fog lamp switch 16 between the lower knob 2 and the middle knob 3, and a light-switch operating knob 5 as an upper knob.

A tubular shaft portion 7 with a vertical groove 6 for use as a detent is formed at the center of lower knob 2. A shaft 8 which functions as what is used for remotely controlling the light switch is swingably passed through the tubular shaft portion 7. Further, the insulator 9 of the fog lamp switch 16 is fitted into the lower knob 2 by fitting a projected portion 10 as a detent into the vertical groove 6 of the tubular shaft portion 7. As shown in FIG. 2, the insulator 9 is formed so that three stationary contacts 12a–12c each for a common contact, a front fog lamp and a rear fog lamp are concentrically inserted into a fitting hole 11 where the projected portion 10 has been formed. An arcuate cam 13 is formed on the outer periphery of the insulator 9. The cam 13 has a low root portion 13a corresponding to the off-position of the fog lamp switch and the on-position of the front fog lamp when the operating knob 4 is swung, and a high crest portion 13b corresponding to the on-position of the rear fog lamp and the on-position of the front fog lamp.

The operating knob 4 in addition to the insulator 9 is fitted into the tubular shaft portion 7 for the fog lamp switch. The operating knob 4 is mated with the opened end portion of the lower knob 2 so as to be made swingable. Then a bridge contact 15 for bridging the stationary contacts 12a–12c is firmly secured to an edge face opposite to the insulator 9 through the swingable operation of the operating knob 4. The -bridge contact 15 is formed of electroconductive flat spring material. Thus, the fog lamp switch 16 is constructed. As shown in FIG. 3, moreover, a fitting hole 17 corresponding to the cam 13 of the insulator 9 is bored in the operating knob 4. A tubular holder 18 is fitted into the fitting hole 17.

A follower 20 is formed on the holder 18, the follower 20 being urged by a coil spring 19 to slide on the cam 13. A coil spring 21 and an engaging piece 22 are mounted in the holder 18. The engaging piece 22 urged by the coil spring 21 so that the degree of its projection from the holder 18 is regulated by a collar 24. A moderation spring 25 and a moderation ball 26 are mounted in a moderation hole 27, which corresponds to a moderation root 33 formed in the middle knob 3.

Subsequently, the middle knob 3 kept in contact with the operating knob 4 is fitted into the tubular shaft portion 7 by mating a projection 31 as a detent with the vertical groove 6. An arcuate operating hole 32 for use in allowing the operating knob 5 to swing is formed in the middle knob 3 into which the holder 18 has been fitted. Further, there are formed moderation roots 33, 34 for giving the sense of moderation to the swingable operation of the operating knobs 4, 5. A coupling member 41 is fitted to the end portion 8a of the shaft 8 which is projected from the end portion of the tubular shaft portion 7 and used for remotely controlling the light switch, the end portion 8a thereof being semi-circular in cross section. In the coupling member 41, there is formed a moderation hole 44 for mounting a moderation ball 42 which mates with the moderation root 34 formed in the middle knob 3 and a moderation spring 43.

Further, an engaging hole 45 which the engaging piece 22 mounted with the holder 18 engages with is formed in the coupling member 41. The engaging hole 45 thus provided is in an arcuate form and corresponds to an OFF, an AUTO, a TAIL and a HEAD position as swingable positions where the light switch is changed over by the operating knob 5. The light-switch operating knob 5 as the upper knob is fitted and firmly secured to the coupling member 41 by driving a stopper pin 46 into it, whereby the operating knob 5 and the shaft 8 are coupled to the coupling member 41. The swingable operation of the operating knob 5 causes the shaft 8 to swing in an interlocking mode and the light switch 47 is changed over. FIG. 4 shows a state in which the operating knob 4 is swung toward to the OFF positions of the rear and front fog lamps and the operating knob 5 is also swung toward the HEAD position of the light switch 47.

Figure 5A:
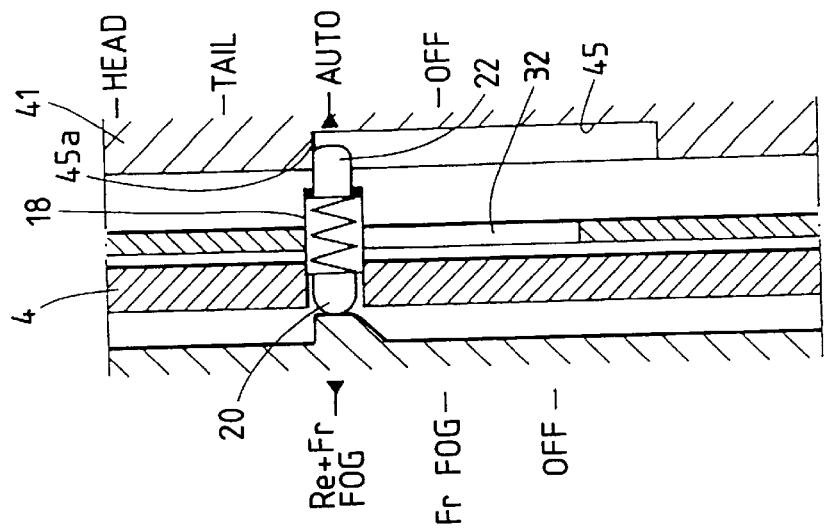
FIGS. 5(a)–5(c) are diagrams explanatory of the automatic OFF-operation of a rear fog lamp.

As shown in FIGS. 5–6, the lever switch thus constructed can perform the switching operation in the following order by swingably operating the operating knob 4: OFF→front fog lamp→front fog lamp+rear fog lamp. Moreover, the lever switch can perform the operation of switching the light switch 47 in the following order: OFF→AUTO→TAIL→HEAD. As shown in FIG. 5(a), further, the holder 18 is urged by the coil spring 19 to become retracted onto the root portion 13a of the cam 13 of the insulator 9 when the fog lamp switch 16 and the light switch 47 are both in the off-state. At this time, the tip of the engaging piece 22 whose degree of projection from the holder 18 has been regulated is not brought into contact with the edge face of the coupling member 41. The leading end portion of the holder 18 is also fitted into the operating hole 32 of the middle knob 3.

Figure 5B:
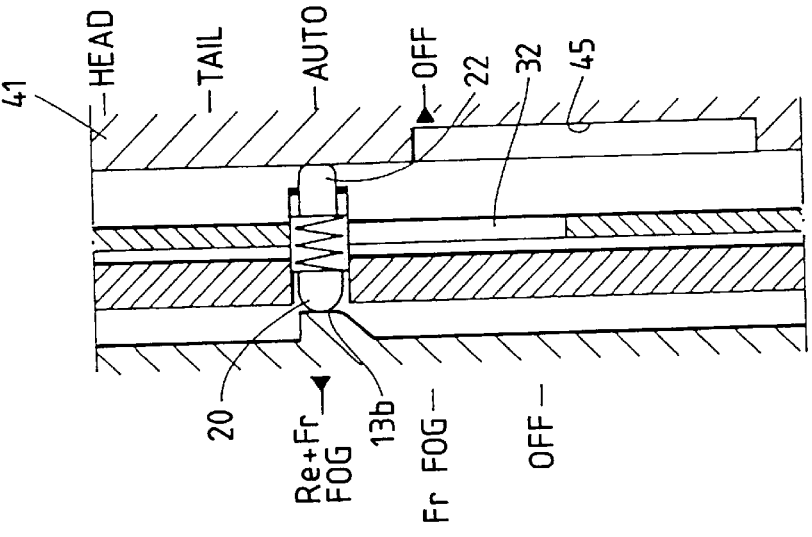

When the front fog lamp is turned on by swinging the operating knob 4, the holder 18 swings in the operating hole 32 in such a state that it has retracted onto the root portion 13a of the cam 13. When the front fog lamp and the rear fog lamp are turned on by swinging the operating knob 4, further, the holder 18 climbs up to the crest portion 13b of the cam 13 and moves forward in the direction of the coupling member 41 as shown in FIG. 5(b) and brings the tip of the engaging piece 22 into contact with the edge face of the coupling member 41. When the operating knob 5 is swung from the OFF position to the AUTO position in this state, the engaging piece 22 is urged by the coil spring 21 to resiliently stick into the arcuate engaging hole 45. While the engaging piece 22 is kept resiliently sticking out, the operating knob 5 can be swung toward each of the positions AUTO→TAIL→HEAD since the engaging hole 45 is arcuate in shape.

Figure 5C:
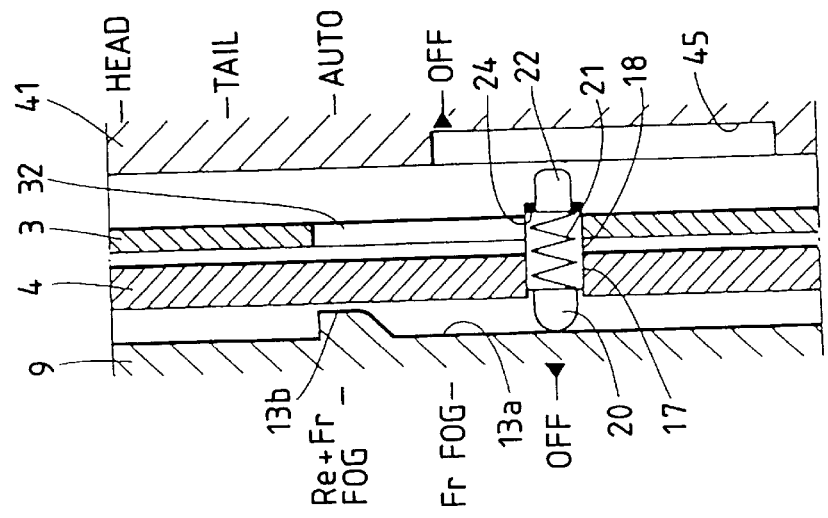

When the operating knob 5 is swung back up to the AUTO position as shown in FIG. 5(c) in order to turn off the light switch 47, the leading end stepped portion 45a of the engaging hole 45 and the engaging piece 22 are mated together. When the operating knob 5 is swung back toward the OFF position, the operating knob 4 is swung back by the engaging piece 22 in the interlocking mode and the holder 18 climbs down from the crest portion 13b of the cam 13, whereby the rear fog lamp is turned off, whereas only the front fog lamp is held ON. In order to turn off the front fog lamp, the operating knob 4 is manually swung back up to the OFF position.

As set forth above, the mechanism incorporated in the lever switch of the lever switch according to the present invention is partly improved in that while the front fog lamp, the rear fog lamp and the light switch 47 are held ON, the engaging piece 22 resiliently sticking and fitting into the engaging hole 45 formed in the coupling member 41 interlocked with the operating knob 5 is used to couple the operating knob 5 and the operating knob 4 so as to swing them together. Therefore, the arrangement of automatically turning off the rear fog lamp is simplified and certainty of operation is secured and besides no special electric circuit is needed with advantage in making less expensive the lever switch having the function of automatically turning off the rear fog lamp than before.

Although a description has been given of an embodiment of the present invention in the form of incorporating the light switch 47 as a first switch means and the fog lamp switch 16 as a second switch means in the lever switch embodied as stated above, it may be feasible to incorporate a front wiper switch as the first switch means and a rear wiper switch as the second switch means. Thus, the rear wiper switch can be turned off automatically when the front wiper switch is turn off during the operation of a front and a rear wiper, for example.

What is claimed is:

1. A lever switch comprising:

an operating lever;

a first switch member including a first operating knob and an engaging hole;

a second switch member including a second operating knob; and an engaging member coupled to said first and second switch members, respectively, and fitted into the engaging hole of said first switch member when the second operating knob is adjusted to an on position and the first operating knob is adjusted to an on position, wherein said second switch member is a lamp switch for controlling two lamps and said on position of the second operating knob refers to a position where both of these lamps are illuminated, and wherein said first and second switch members are configured via said engaging member such that when the first operating knob is changed from its on position to its off position, the second operating knob is changed from said position where both of said lamps are illuminated to a position where only one of said lamps is illuminated.

2. The lever switch of claim 1, wherein said engaging member comprises a holder member in which a spring and an engaging piece are mounted.

3. The lever switch of claim 1, wherein the engaging hole of the first switch member is arcuate in form.

4. A method for automatically turning off a second switch means of a lever switch simultaneously when a first switch means of the lever switch is turned off, comprising the steps of:

turning an operating knob of said second switch means to an on position;

turning an operating knob of said first switch means to an on position;

fitting an engaging member coupled to said first and second switch means within an engaging hole of said first switch means when each of said operating knobs are adjusted to respective on positions and simultaneously forming an interlock between the first and second switch means; and turning said operating knob of said first switch means from its on position to an off position and simultaneously adjusting said operating knob of said second switch means from its on position to an off position as a result of said interlock, wherein said second switch means is a lamp switch for controlling two lamps and said on position of the second switch means refers to a position where both of these lamps are illuminated and said off position of the second switch means refers to a position where only one of these lamps is illuminated.

5. The method of claim 4, wherein said engaging hole of said first switch means is arcuate in form.

* * * * *